United States Patent
Ishii et al.

(10) Patent No.: US 11,377,390 B2
(45) Date of Patent: Jul. 5, 2022

(54) CUBIC BORON NITRIDE SINTERED MATERIAL

(71) Applicants: Sumitomo Electric Industries, Ltd., Osaka (JP); SUMITOMO ELECTRIC HARDMETAL CORP., Itami (JP)

(72) Inventors: Akito Ishii, Osaka (JP); Katsumi Okamura, Osaka (JP); Hironari Moroguchi, Itami (JP); Satoru Kukino, Itami (JP)

(73) Assignees: Sumitomo Electric Industries, Ltd., Osaka (JP); SUMITOMO ELECTRIC HARDMETAL CORP., Itami (JP)

(*) Notice: Subject to any disclaimer, the term of this patent is extended or adjusted under 35 U.S.C. 154(b) by 0 days.

(21) Appl. No.: 17/255,733

(22) PCT Filed: Dec. 16, 2019

(86) PCT No.: PCT/JP2019/049193
§ 371 (c)(1),
(2) Date: Dec. 23, 2020

(87) PCT Pub. No.: WO2021/124401
PCT Pub. Date: Jun. 24, 2021

(65) Prior Publication Data
US 2021/0355036 A1 Nov. 18, 2021

(51) Int. Cl.
C04B 35/5831 (2006.01)
C04B 35/626 (2006.01)
C04B 35/645 (2006.01)

(52) U.S. Cl.
CPC ...... *C04B 35/5831* (2013.01); *C04B 35/6261* (2013.01); *C04B 35/6264* (2013.01); *C04B 35/645* (2013.01); *C04B 2235/386* (2013.01); *C04B 2235/3847* (2013.01); *C04B 2235/402* (2013.01); *C04B 2235/404* (2013.01); *C04B 2235/405* (2013.01); *C04B 2235/656* (2013.01)

(58) Field of Classification Search
CPC ............ C04B 35/5831; C04B 35/6261; C04B 35/6264; C04B 2235/656; C04B 2235/386
See application file for complete search history.

(56) References Cited

U.S. PATENT DOCUMENTS

| 7,758,976 | B2 * | 7/2010 | Kukino | C04B 35/581 |
|---|---|---|---|---|
| | | | | 428/698 |
| 2005/0143252 | A1 | 6/2005 | Okamura et al. | |
| 2006/0213127 | A1 | 9/2006 | Saka et al. | |
| 2008/0214383 | A1 | 9/2008 | Matsukawa et al. | |
| 2008/0254282 | A1 | 10/2008 | Kukino et al. | |
| 2015/0328691 | A1 | 11/2015 | Okamura et al. | |
| 2017/0369314 | A1 | 12/2017 | Zhang et al. | |
| 2019/0071360 | A1 | 3/2019 | Shin et al. | |

FOREIGN PATENT DOCUMENTS

| CN | 109534826 A | 3/2019 |
|---|---|---|
| JP | 2005-187260 A | 7/2005 |
| JP | 2006-347850 A | 12/2006 |
| JP | 2018-505839 A | 3/2018 |
| JP | 2019-515864 A | 6/2019 |
| WO | WO-2004/103615 A1 | 12/2004 |
| WO | WO-2005/066381 A1 | 7/2005 |
| WO | WO-2007/039955 A1 | 4/2007 |
| WO | WO-2007/145071 A1 | 12/2007 |

OTHER PUBLICATIONS

Notice of Reasons of Rejection with English Language Translation dated Mar. 16, 2021, issued in Japanese patent application No. 2021-500314.
Shinichi Shikata et al., "Evaluation of Defect of Low-Resistance Diamond for Power Devices", Kyushu Synchrotron Light Research Center, (2018), vol. 2016, pp. 14-16.
N. V. Novikov et al., "Studies on the Plastic Deformation of CBN", Sverkhtverdye Materialy, May 14, 1985, vol. 7, No. 2, pp. 17-20 (with attached English-language translation).

* cited by examiner

*Primary Examiner* — Noah S Wiese
(74) *Attorney, Agent, or Firm* — Faegre Drinker Biddle & Reath LLP

(57) ABSTRACT

A cubic boron nitride sintered material includes: more than 80 volume % and less than 100 volume % of cubic boron nitride grains; and more than 0 volume % and less than 20 volume % of a binder phase. The binder phase includes: at least one selected from a group consisting of a simple substance, an alloy, and an intermetallic compound selected from a group consisting of a group 4 element, a group 5 element, a group 6 element in a periodic table, aluminum, silicon, cobalt, and nickel. A dislocation density of the cubic boron nitride grains is more than or equal to $3\times10^{17}/m^2$ and less than or equal to $1\times10^{20}/m^2$.

6 Claims, No Drawings

CUBIC BORON NITRIDE SINTERED MATERIAL

TECHNICAL FIELD

The present disclosure relates to a cubic boron nitride sintered material.

BACKGROUND ART

A cubic boron nitride sintered material (hereinafter, also referred to as "cBN sintered material") is a high-hardness material used for cutting tools and the like. The cBN sintered material is normally constituted of cubic boron nitride grains (hereinafter, also referred to as "cBN grains") and a binder phase. Depending on a content ratio of the cBN grains, characteristics of the cBN sintered material tend to differ.

Hence, in the field of cutting, different types of cBN sintered materials are applied to cutting tools in accordance with the material of a workpiece, required precision in processing, or the like. For example, a cBN sintered material having a high content ratio of cubic boron nitride (hereinafter, also referred to as "cBN") can be used suitably for cutting of a sintered alloy or the like.

As a sintered material having a high content of cBN and attaining both breakage resistance and wear resistance, WO 2005/066381 (PTL 1) discloses a cBN sintered material including: more than or equal to 70 volume % and less than or equal to 98 volume % of cBN grains; and a binder phase composed of a Co compound, an Al compound, WC, and a solid solution thereof.

CITATION LIST

Patent Literature

PTL 1: WO 2005/066381

SUMMARY OF INVENTION

A cubic boron nitride sintered material of the present disclosure includes:
more than 80 volume % and less than 100 volume % of cubic boron nitride grains; and
more than 0 volume % and less than 20 volume % of a binder phase, wherein the binder phase includes
at least one selected from a group consisting of a simple substance, an alloy, and an intermetallic compound selected from a group consisting of a group 4 element, a group 5 element, a group 6 element in a periodic table, aluminum, silicon, cobalt, and nickel,
at least one selected from a group consisting of a compound composed of at least one element selected from the group consisting of the group 4 element, the group 5 element, the group 6 element in the periodic table, aluminum, silicon, cobalt, and nickel, and at least one element selected from a group consisting of nitrogen, carbon, boron, and oxygen, and a solid solution originated from the compound, or
the at least one selected from the group consisting of the simple substance, the alloy, and the intermetallic compound selected from the group consisting of the group 4 element, the group 5 element, the group 6 element in the periodic table, aluminum, silicon, cobalt, and nickel, and the at least one selected from the group consisting of the compound composed of the at least one element selected from the group consisting of the group 4 element, the group 5 element, the group 6 element in the periodic table, aluminum, silicon, cobalt, and nickel, and the at least one element selected from the group consisting of nitrogen, carbon, boron, and oxygen, and the solid solution originated from the compound, and
a dislocation density of the cubic boron nitride grains is more than or equal to $3 \times 10^{17}/m^2$ and less than or equal to $1 \times 10^{20}/m^2$.

DETAILED DESCRIPTION

Problems to be Solved by the Present Disclosure

In recent years, in response to improvement in hardness and strength of a sintered alloy, a tool used for cutting of such a sintered alloy has been required to be improved in breakage resistance.

Thus, it is an object to provide a cubic boron nitride sintered material that can attain excellent breakage resistance even in cutting of a sintered alloy when used as a tool material.

Advantageous Effect of the Present Disclosure

The cubic boron nitride sintered material of the present disclosure can attain excellent breakage resistance even in cutting of a sintered alloy when used as a tool material.

Description of Embodiment

First, embodiments of the present disclosure are listed and described.

(1) A cubic boron nitride sintered material of the present disclosure includes:
more than 80 volume % and less than 100 volume % of cubic boron nitride grains; and
more than 0 volume % and less than 20 volume % of a binder phase, wherein the binder phase includes
at least one selected from a group consisting of a simple substance, an alloy, and an intermetallic compound selected from a group consisting of a group 4 element, a group 5 element, a group 6 element in a periodic table, aluminum, silicon, cobalt, and nickel,
at least one selected from a group consisting of a compound composed of at least one element selected from the group consisting of the group 4 element, the group 5 element, the group 6 element in the periodic table, aluminum, silicon, cobalt, and nickel, and at least one element selected from a group consisting of nitrogen, carbon, boron, and oxygen, and a solid solution originated from the compound, or
the at least one selected from the group consisting of the simple substance, the alloy, and the intermetallic compound selected from the group consisting of the group 4 element, the group 5 element, the group 6 element in the periodic table, aluminum, silicon, cobalt, and nickel, and the at least one selected from the group consisting of the compound composed of the at least one element selected from the group consisting of the group 4 element, the group 5 element, the group 6 element in the periodic table, aluminum, silicon, cobalt, and nickel, and the at least one element selected from the group consisting of nitrogen, carbon, boron, and oxygen, and the solid solution originated from the compound, and
a dislocation density of the cubic boron nitride grains is more than or equal to $3 \times 10^{17}/m^2$ and less than or equal to $1 \times 10^{20}/m^2$.

The cubic boron nitride sintered material of the present disclosure can attain excellent breakage resistance even in cutting of a sintered alloy when used as a tool material.

(2) Preferably, the dislocation density of the cubic boron nitride grains is more than or equal to $5 \times 10^{17}/m^2$ and less than or equal to $9.5 \times 10^{19}/m^2$. Accordingly, the breakage resistance is further improved.

(3) Preferably, the dislocation density of the cubic boron nitride grains is more than or equal to $8 \times 10^{17}/m^2$ and less than or equal to $9 \times 10^{19}/m^2$. Accordingly, the breakage resistance is further improved.

(4) Preferably, each of the cubic boron nitride grains contains more than or equal to 0.02 mass % and less than or equal to 0.2 mass % of calcium. Accordingly, the breakage resistance is further improved.

(5) Preferably, each of the cubic boron nitride grains contains more than or equal to 0.05 mass % and less than or equal to 0.17 mass % of calcium. Accordingly, the breakage resistance is further improved.

(6) Preferably, each of the cubic boron nitride grains contains more than or equal to 0.07 mass % and less than or equal to 0.15 mass % of calcium. Accordingly, the breakage resistance is further improved.

Details of Embodiment

First, the present inventors conducted a study on a cause of a decreased breakage resistance when a tool employing a conventional cubic boron nitride sintered material is used for cutting of a sintered alloy. As a result, it was found that the hardness and strength of the cubic boron nitride sintered material are insufficient, with the result that breakage is likely to occur.

The present inventors further conducted a detailed study on a factor that affects the hardness and strength of the cubic boron nitride sintered material. As a result, the present inventors newly found that the dislocation density of cubic boron nitride grains affects the hardness and strength of the cubic boron nitride sintered material. It should be noted that since cubic boron nitride includes an extremely large number of dislocations, one having ordinary skill in the art have not conventionally paid attention to a relation between the dislocation density of the cubic boron nitride grains and each of the hardness, the strength, and the breakage resistance.

As a result of diligent study, the present inventors completed the cubic boron nitride sintered material of the present disclosure in view of the above-described knowledge.

The following describes a specific example of the cubic boron nitride sintered material of the present disclosure. In the present specification, the expression "A to B" represents a range of lower to upper limits (i.e., more than or equal to A and less than or equal to B). When no unit is indicated for A and a unit is indicated only for B, the unit of A is the same as the unit of B.

When a compound or the like is expressed by a chemical formula in the present specification and an atomic ratio is not particularly limited, it is assumed that all the conventionally known atomic ratios are included. The atomic ratio should not be necessarily limited only to one in the stoichiometric range. For example, when "TiN" is described, the atomic ratio of TiN includes all the conventionally known atomic ratios.

<<Cubic Boron Nitride Sintered Material>>

A cubic boron nitride sintered material includes: more than 80 volume % and less than 100 volume % of cubic boron nitride grains; and more than 0 volume % and less than 20 volume % of a binder phase, wherein the binder phase includes at least one selected from a group consisting of a simple substance, an alloy, and an intermetallic compound selected from a group consisting of a group 4 element, a group 5 element, a group 6 element in a periodic table, aluminum, silicon, cobalt, and nickel, at least one selected from a group consisting of a compound composed of at least one element selected from the group consisting of the group 4 element, the group 5 element, the group 6 element in the periodic table, aluminum, silicon, cobalt, and nickel, and at least one element selected from a group consisting of nitrogen, carbon, boron, and oxygen, and a solid solution originated from the compound, or the at least one selected from the group consisting of the simple substance, the alloy, and the intermetallic compound selected from the group consisting of the group 4 element, the group 5 element, the group 6 element in the periodic table, aluminum, silicon, cobalt, and nickel, and the at least one selected from the group consisting of the compound composed of the at least one element selected from the group consisting of the group 4 element, the group 5 element, the group 6 element in the periodic table, aluminum, silicon, cobalt, and nickel, and the at least one element selected from the group consisting of nitrogen, carbon, boron, and oxygen, and the solid solution originated from the compound, and a dislocation density of the cubic boron nitride grains is more than or equal to $3 \times 10^{17}/m^2$ and less than or equal to $1 \times 10^{20}/m^2$.

The cubic boron nitride sintered material of the present disclosure can attain excellent breakage resistance particularly in cutting of a sintered alloy when used as a tool material. This is presumably due to the following reasons (i) to (iii).

(i) The cubic boron nitride sintered material of the present disclosure includes more than 80 volume % and less than 100 volume % of cBN grains, each of which has high hardness, high strength, and high toughness. Accordingly, the cubic boron nitride sintered material has excellent wear resistance and breakage resistance, thus presumably resulting in a long tool life.

(ii) In the cubic boron nitride sintered material of the present disclosure, the binder phase includes:

at least one selected from a group consisting of a simple substance, an alloy, and an intermetallic compound selected from a group consisting of a group 4 element, a group 5 element, a group 6 element in a periodic table, aluminum, silicon, cobalt, and nickel;

at least one selected from a group consisting of a compound composed of at least one element selected from the group consisting of the group 4 element, the group 5 element, the group 6 element in the periodic table, aluminum, silicon, cobalt, and nickel, and at least one element selected from a group consisting of nitrogen, carbon, boron, and oxygen, and a solid solution originated from the compound; or the at least one selected from the group consisting of the simple substance, the alloy, and the intermetallic compound selected from the group consisting of the group 4 element, the group 5 element, the group 6 element in the periodic table, aluminum, silicon, cobalt, and nickel, and the at least one selected from the group consisting of the compound composed of the at least one element selected from the group consisting of the group 4 element, the group 5 element, the group 6 element in the periodic table, aluminum, silicon, cobalt, and nickel, and the at least one element selected from the group consisting of nitrogen, carbon, boron, and oxygen, and the solid solution originated from the compound.

The binder phase has high binding force with respect to the cBN grains. Therefore, the cubic boron nitride sintered material presumably has excellent breakage resistance.

(iii) In the cubic boron nitride sintered material of the present disclosure, the dislocation density of the cubic boron nitride grains is more than or equal to $3 \times 10^{17}/m^2$ and less than or equal to $1 \times 10^{20}/m^2$. In the cubic boron nitride grains, dislocations are three-dimensionally in contact with one another to improve strength in all the directions, thus presumably resulting in improved breakage resistance.

It has been described above that the tool employing the cubic boron nitride sintered material of the present disclosure has a long tool life in cutting of the sintered alloy; however, the workpiece is not limited to this. Examples of the workpiece include chromium molybdenum steel (SCM415), carbon steel for machine construction (S50C), high-carbon chromium bearing steel (SUJ2, SUJ4), alloy tool steel (SKD11), gray iron (FC250), and the like.

(Composition of Cubic Boron Nitride Sintered Material)

The cubic boron nitride sintered material of the present disclosure includes: more than 80 volume % and less than 100 volume % of the cubic boron nitride grains; and more than 0 volume % and less than 20 volume % of the binder phase. It should be noted that the cBN sintered material can include an inevitable impurity resulting from a source material, a manufacturing condition, or the like.

The lower limit of the content ratio of the cBN grains in the cBN sintered material is more than 80 volume %, is preferably more than or equal to 83 volume %, and is more preferably more than or equal to 85 volume %. The upper limit of the content ratio of the cBN grains in the cBN sintered material is less than 100 volume %, is preferably less than or equal to 95 volume %, and is more preferably less than or equal to 93 volume %. The content ratio of the cBN grains in the cBN sintered material is more than 80 volume % and less than 100 volume %, is preferably more than or equal to 83 volume % and less than or equal to 95 volume %, and is more preferably more than or equal to 85 volume % and less than or equal to 93 volume %.

The lower limit of the content ratio of the binder phase in the cBN sintered material is more than 0 volume %, is preferably more than or equal to 5 volume %, and is more preferably more than or equal to 7 volume %. The upper limit of the content ratio of the binder phase in the cBN sintered material is less than 20 volume %, is preferably less than or equal to 17 volume % and is more preferably less than or equal to 15 volume %. The content ratio of the binder phase in the cBN sintered material is more than 0 volume % and less than 20 volume %, is preferably more than or equal to 5 volume % and less than or equal to 17 volume %, and is more preferably more than or equal to 7 volume % and less than or equal to 15 volume %.

The content ratio (volume %) of the cBN grains and the content ratio (volume %) of the binder phase in the cBN sintered material can be checked by performing structure observation, elemental analysis, and the like onto the cBN sintered material using an energy dispersive X-ray analysis device (EDX) (Octane Elect EDS system) accompanied with a scanning electron microscope (SEM) ("JSM-7800F" (trade name) provided by JEOL) (hereinafter, also referred to as "SEM-EDX"). A specific measurement method thereof is as follows.

First, the cBN sintered material is cut at an arbitrary location to produce a sample including a cross section of the cBN sintered material. For the production of the cross section, a focused ion beam device, a cross section polisher device, or the like can be used. Next, the cross section is observed by the SEM at a magnification of 5000× to obtain a reflected electron image. In the reflected electron image, a black region represents a region in which the cBN grains exist and a gray or white region represents a region in which the binder phase exists.

Next, the reflected electron image is subjected to binarization processing using image analysis software ("WinROOF" provided by Mitani Corporation). From the image having been through the binarization processing, the area ratio of pixels originated from dark fields (pixels originated from the cBN grains) in the area of the measurement visual field is calculated. The calculated area ratio is regarded as volume %, thereby finding the content ratio (volume %) of the cBN grains.

From the image having been through the binarization processing, the area ratio of pixels originated from bright fields (pixels originated from the binder phase) in the area of the measurement visual field is calculated, thereby finding the content ratio (volume %) of the binder phase.

In the measurement performed by the Applicant, as long as the content ratio (volume %) of the cBN grains and the content ratio (volume %) of the binder phase are measured in the same sample of the cBN sintered material, results of measurement were not substantially varied even when measurement visual fields to be selected were changed and calculation was performed multiple times. It was confirmed that the results of measurement are not intentional even when a measurement visual field is set arbitrarily.

It should be noted that an elemental analysis can be performed onto the cBN sintered material using SEM-EDX to confirm that the pixels originated from the dark fields are originated from the cBN grains.

(Inevitable Impurity)

The cubic boron nitride sintered material of the present disclosure may include an inevitable impurity as long as the effect of the present disclosure is exhibited. Examples of the inevitable impurity include hydrogen, oxygen, carbon, and an metal element such as an alkali metal element (lithium (Li), sodium (Na), potassium (K) or the like) or an alkali earth metal element (calcium (Ca), magnesium (Mg) or the like). When the cubic boron nitride sintered material includes an inevitable impurity, the content of the inevitable impurity is preferably less than or equal to 0.1 mass %. The content of the inevitable impurity can be measured by secondary ion mass spectrometry (SIMS).

<<Cubic Boron Nitride Grains>>

(Dislocation Density) The dislocation density of the cubic boron nitride grains included in the cubic boron nitride sintered material of the present disclosure is more than or equal to $3 \times 10^{17}/m^2$ and less than or equal to $1 \times 10^{20}/m^2$. In the cubic boron nitride grains, dislocations are three-dimensionally in contact with one another to improve strength in all the directions, thus presumably resulting in improved breakage resistance. Meanwhile, when the dislocation density is less than or equal to $1 \times 10^{20}/m^2$, breakage resulting from defects in the grains is less likely to occur, thus resulting in a long tool life.

The lower limit of the dislocation density of the cubic boron nitride grains is more than or equal to $3 \times 10^{17}/m^2$, is preferably more than or equal to $5 \times 10^{17}/m^2$, and is more preferably more than or equal to $8 \times 10^{17}/m^2$. The upper limit of the dislocation density is less than or equal to $1 \times 10^{20}/m^2$, is preferably less than or equal to $9.5 \times 10^{19}/m^2$, and is more preferably less than or equal to $9 \times 10^{19}/m^2$. The dislocation density is more than or equal to $3\times10^{17}/m^2$ and less than or equal to $1\times10^{20}/m^2$, is more preferably more than or equal to $5\times10^{17}/m^2$ and less than or equal to $9.5\times10^{19}/m^2$, and is more preferably more than or equal to $8\times10^{17}/m^2$ and less than or equal to $9\times10^{19}/m^2$.

In the present specification, the dislocation density of the cubic boron nitride grains is measured in a large-scale radiation facility (for example, SPring-8 (in Hyogo Prefecture)). Specifically, the dislocation density is measured in the following manner.

A sample of the cubic boron nitride sintered material is immersed in hydrofluoric-nitric acid (hydrofluoric acid:nitric acid=5:5 (volume ratio)) at 140° C. for 48 hours within a sealed container. Accordingly, all the binder phase is dissolved in the hydrofluoric-nitric acid and only the cBN grains remain. The cBN grains are introduced into a capillary for X-ray crystal analysis with 0.3 mmϕ provided by TOHO ("Mark Tube" (trademark) provided by TOHO), thus obtaining a sealed-off specimen.

The specimen is subjected to an X-ray diffraction measurement under the following conditions to obtain line profiles of diffraction peaks from respective orientation planes of (111), (200), (220), (311), (400), and (531), which are major orientations of the cubic boron nitride.

(Conditions for X-ray Diffraction Measurement)
X-ray source: synchrotron radiation
Condition for equipment: detector MYTHEN
Energy: 18 keV (wavelength: 0.6888 angstrom)
Camera length: 573 mm
Measurement peak: six peaks from cubic boron nitride's (111), (200), (220), (311), (400), and (531). When it is difficult to obtain a profile depending on texture and orientation, the peak for that Miller index is excluded.

Measuring condition: there are 9 or more measurement points set in the full width at half maximum corresponding to each measurement peak. Peak top intensity is set to 2000 counts or more. Peak tail is also used in the analysis, and accordingly, the measurement range is set to about 10 times the full width at half maximum.

A line profile obtained from the above X-ray diffraction measurement will be a profile including both a true broadening attributed to a physical quantity such as the sample's inhomogeneous strain and a broadening attributed to the equipment. In order to determine inhomogeneous strain and crystallite size, a component attributed to the equipment is removed from the measured line profile to obtain a true line profile. The true line profile is obtained by fitting the obtained line profile and the line profile that is attributed to the equipment by a pseudo Voigt function, and subtracting the line profile attributed to the equipment. $LaB_6$ was used as a standard sample for removing a broadening of a diffracted peak attributed to the equipment. When significantly collimated radiation is used, a broadening of a diffracted peak attributed to the equipment may be regarded as zero.

The obtained true line profile is analyzed using the modified Williamson-Hall method and the modified Warren-Averbach method to calculate dislocation density. The modified Williamson-Hall method and the modified Warren-Averbach method are known line profile analysis methods used for determining dislocation density.

The modified Williamson-Hall method's expression is represented by the following expression (I):

$$\Delta K = \frac{0.9}{D} + \left(\frac{\pi M^2 b^2}{2}\right)^{1/2} \rho^{1/2} K C^{1/2} + O(K^2 C) \quad (I)$$

where $\Delta K$ represents a half width of a line profile, D represents a crystallite size, M represents a dislocation arrangement parameter, b represents a Burgers vector, ρ represents dislocation density, K represents a scattering vector, $O(K^2C)$ represents a higher-order term of $K^2C$, and C represents an average contrast factor. C in the above expression (I) is represented by the following expression (II):

$$C=C_{h00}[1-q(h^2k^2+h^2l^2+k^2l^2)/(h^2k^2+l^2)^2] \quad (II).$$

In the above expression (II), a contrast factor $C_{h00}$ for screw dislocation and that for edge dislocation and a coefficient q for each contrast factor are obtained by using the computing code ANIZC, with a slip system of <110>{111}, and elastic stiffness $C_{11}$, $C_{12}$ and $C_{44}$ of 8.44 GPa, 1.9 GPa, and 4.83 GPa, respectively. Contrast factor $C_{h00}$ is 0.203 for screw dislocation and 0.212 for edge dislocation. The coefficient q for the contrast factor is 1.65 for screw dislocation and 0.58 for edge dislocation. Note that screw dislocation's ratio is fixed to 0.5 and edge dislocation's ratio is fixed to 0.5.

Furthermore, between dislocation and inhomogeneous strain, a relationship represented by an expression (III) is established using contrast factor C, as below:

$$<\varepsilon(L)^2>=(\rho Cb^2/4\pi)ln(R_e/L) \quad (III),$$

where $R_e$ represents dislocation's effective radius.

By the relationship of the above expression (III) and the Warren-Averbach expression, the following expression (IV) can be presented, and as the modified Warren-Averbach method, dislocation density ρ and a crystallite size can be determined.

$$lnA(L)=lnA^S(L)-(\pi L^2\rho b^2/2)ln(R_e/L)(K^2C)+O(K^2C)^2 \quad (IV),$$

where A(L) represents a Fourier series, $A^S(L)$ represents a Fourier series for a crystallite size, and L represents a Fourier length.

For details of the modified Williamson-Hall method and the modified Warren-Averbach method, see T. Ungar and A. Borbely, "The effect of dislocation contrast on x-ray line broadening: A new approach to line profile analysis," Appl. Phys. Lett., vol.69, no.21, p.3173, 1996, and T. Ungar, S. Ott, P. Sanders, A. Borbely, J. Weertman, "Dislocations, grain size and planar faults in nanostructured copper determined by high resolution X-ray diffraction and a new procedure of peak profile analysis," Acta Mater., vol.46, no.10, pp.3693-3699, 1998.

As measured by the applicant, it has been confirmed that, for measurement of the cBN grains' dislocation density in the same sample, while a location where a measurement range is selected is changed and calculation is thus performed for a plurality of times, measurement results are obtained without substantial variation and the results of measurement are not intentional even when a measurement visual field is set arbitrarily.

(Calcium Content)
Each of the cubic boron nitride grains included in the cubic boron nitride sintered material of the present disclosure preferably contains more than or equal to 0.02 mass % and less than or equal to 0.2 mass % of calcium. When each of the cBN grains contains calcium, atomic vacancies are reduced in the cBN grain to improve strength and toughness of the cBN grain at a normal temperature and a high temperature, with the result that the life of a tool employing the cubic boron nitride sintered material is further improved.

The upper limit of the calcium content of the cubic boron nitride grain is preferably less than or equal to 0.2 mass %, is more preferably less than or equal to 0.17 mass %, and is further preferably less than or equal to 0.15 mass %. The lower limit of the calcium content of the cubic boron nitride grain is preferably more than or equal to 0.02 mass %, is more preferably more than or equal to 0.05 mass %, and is further preferably more than or equal to 0.07 mass %. The calcium content of the cubic boron nitride grain is preferably more than or equal to 0.02 mass % and less than or equal to 0.2 mass %, is more preferably more than or equal to 0.05 mass % and less than or equal to 0.17 mass %, and is further preferably more than or equal to 0.07 mass % and less than or equal to 0.15 mass %.

The calcium content of the cubic boron nitride grain is measured in the following manner.

A sample of the cubic boron nitride sintered material is immersed in hydrofluoric-nitric acid (hydrofluoric acid:nitric acid=5:5 (volume ratio)) at 140° C. for 48 hours within a sealed container, and is then filtered. The filtered residue, cBN, was immersed for 1 hour in a solvent at 1000° C., the solvent including $Na_2CO_3$ and $B_2O_3$ at the following weight ratio: $Na_2CO_3:B_2O_3=3:0.5$. In this way, a remaining binder is removed. Then, the sample is immersed for 30 minutes in a solution including hydrochloric acid and hydrogen peroxide solution at the following weight ratio: hydrochloric acid:hydrogen peroxide solution=1:1. This solution having cBN dissolved therein is subjected to a high-frequency induction plasma spectrometry (ICP) (measurement device: "ICPS-8100" provided by Shimadzu Corporation), thereby performing quantitative measurement of the calcium content of the cBN grain.

(Median Size d50)

Median size d50 of equivalent circle diameters of the cubic boron nitride grains included in the cubic boron nitride sintered material of the present disclosure (hereinafter, also referred to as "median size d50") is preferably more than or equal to 1 nm and less than or equal to 30000 nm, and is more preferably more than or equal to 10 nm and less than or equal to 15000 nm. Accordingly, a tool employing the cubic boron nitride sintered material can have a long tool life.

In the present specification, median size d50 of the equivalent circle diameters of the cubic boron nitride grains refers to a value obtained by calculating an average value of respective median sizes d50 of a plurality of cubic boron nitride grains measured at five arbitrarily selected measurement portions. A specific measurement method thereof is as follows.

When the cubic boron nitride sintered material is used as a portion of a tool, the portion of the cubic boron nitride sintered material is cut out using a diamond wheel electrodeposition wire or the like, and a cut cross section is polished, and five measurement portions are set arbitrarily in the polished surface.

The polished surface at each measurement portion is observed using SEM ("JSM-7500F" (trade name) provided by JEOL), thereby obtaining a SEM image. The size of the measurement visual field is set to 12 μm×15 μm and the observation magnification is set to 10000×.

For each of the five SEM images, the distribution of the equivalent circle diameters of the cubic boron nitride grains is calculated using image processing software (Win Roof ver.7.4.5) with grain boundaries between the cubic boron nitride grains observed in the measurement visual field being separated from each other.

From the distribution of the equivalent circle diameters of the cubic boron nitride grains, median sizes d50 at the respective measurement portions are calculated, and an average value thereof is calculated. The average value corresponds to median size d50 of the equivalent circle diameters of the cubic boron nitride grains.

In the measurement performed by the Applicant, as long as median sizes d50 of the cubic boron nitride grains are measured in the same sample, results of measurement were not substantially varied even when measurement visual fields to be selected in the cubic boron nitride sintered material were changed and calculation was performed multiple times. It was confirmed that the results of measurement are not intentional even when a measurement visual field is set arbitrarily.

<<Binder Phase>>

The binder phase serves to allow the cBN grains, each of which is a material difficult to be sintered, to be sintered at industrial levels of pressure and temperature. Moreover, reactivity of the binder phase with respect to iron is lower than that of cBN. Hence, in cutting of a high-hardness sintered alloy, the binder phase additionally works to suppress chemical wear and thermal wear. Moreover, when the cBN sintered material contains the binder phase, wear resistance in high-efficient processing of a high-hardness sintered alloy is improved.

In the cBN sintered material of the present disclosure, the binder phase includes:

at least one selected from a group consisting of a simple substance, an alloy, and an intermetallic compound selected from a group (hereinafter, also referred to as "group A") consisting of a group 4 element, a group 5 element, a group 6 element in a periodic table, aluminum, silicon, cobalt, and nickel;

at least one selected from a group consisting of a compound composed of at least one element selected from the group (group A) consisting of the group 4 element, the group 5 element, the group 6 element in the periodic table, aluminum, silicon, cobalt, and nickel, and at least one element selected from a group (hereinafter, also referred to as "group B") consisting of nitrogen, carbon, boron, and oxygen, and a solid solution originated from the compound; or the at least one selected from the group consisting of the simple substance, the alloy, and the intermetallic compound selected from the group (group A) consisting of the group 4 element, the group 5 element, the group 6 element in the periodic table, aluminum, silicon, cobalt, and nickel, and the at least one selected from the group consisting of the compound composed of the at least one element selected from the group (group A) consisting of the group 4 element, the group 5 element, the group 6 element in the periodic table, aluminum, silicon, cobalt, and nickel, and the at least one element selected from the group (group B) consisting of nitrogen, carbon, boron, and oxygen, and the solid solution originated from the compound. That is, the binder phase can be in any one of the following forms (a) to (f).

(a) The binder phase is composed of at least one of a simple substance, an alloy, and an intermetallic compound of group A.

(b) The binder phase includes at least one of a simple substance, an alloy, and an intermetallic compound of group A.

(c) The binder phase is composed of at least one selected from a group consisting of: a compound composed of at least one element selected from group A and at least one element selected from group B; and a solid solution originated from the compound.

(d) The binder phase includes at least one selected from a group consisting of: a compound composed of at least one element selected from group A and at least one element selected from group B; and a solid solution originated from the compound.

(e) The binder phase is composed of at least one selected from a group consisting of: at least one of a simple substance, an alloy, and an intermetallic compound of group A; a compound composed of at least one element selected from group A and at least one element selected from group B; and a solid solution originated from the compound.

(f) The binder phase includes at least one selected from a group consisting of: at least one of a simple substance, an alloy, and an intermetallic compound of group A; a compound composed of at least one element selected from group A and at least one element selected from group B; and a solid solution originated from the compound.

The group 4 element in the periodic table includes titanium (Ti), zirconium (Zr), and hafnium (Hf), for example. The group 5 element includes vanadium (V), niobium (Nb), and tantalum (Ta), for example. The group 6 element includes chromium (Cr), molybdenum (Mo), and tungsten (W), for example. Hereinafter, each of the group 4 element, the group 5 element, the group 6 element, aluminum, silicon, cobalt, and nickel are also referred to as "first metal element".

Examples of an alloy of the first metal element(s) include Ti—Zr, Ti—Hf, Ti—V, Ti—Nb, Ti—Ta, Ti—Cr, and Ti—Mo. Examples of the intermetallic compound of the first metal element(s) include $TiCr_2$ and $Ti_3Al$ and Co—Al.

Examples of the compound (nitride) including the first metal element(s) and nitrogen include titanium nitride (TiN), zirconium nitride (ZrN), hafnium nitride (HfN), vanadium nitride (VN), niobium nitride (NbN), tantalum nitride (TaN), chromium nitride ($Cr_2N$), molybdenum nitride (MoN), tungsten nitride (WN), aluminum nitride (AlN), silicon nitride ($Si_3N_4$), cobalt nitride (CoN), nickel nitride (NiN), titanium zirconium nitride (TiZrN), titanium hafnium nitride (TiHfN), titanium vanadium nitride (TiVN), titanium niobium nitride (TiNbN), titanium tantalum nitride (TiTaN), titanium chromium nitride (TiCrN), titanium molybdenum nitride (TiMoN), titanium tungsten nitride (TiWN), titanium aluminum nitride (TiAlN, $Ti_2AlN$, $Ti_3AlN$), zirconium hafnium nitride (ZrHfN), zirconium vanadium nitride (ZrVN), zirconium niobium nitride (ZrNbN), zirconium tantalum nitride (ZrTaN), zirconium chromium nitride (ZrCrN), zirconium molybdenum nitride (ZrMoN), zirconium tungsten nitride (ZrWN), hafnium vanadium nitride (HfVN), hafnium niobium nitride (HfNbN), hafnium tantalum nitride (HfTaN), hafnium chromium nitride (HfCrN), hafnium molybdenum nitride (HfMoN), hafnium tungsten nitride (HfWN), vanadium niobium nitride (VNbN), vanadium tantalum nitride (VTaN), vanadium chromium nitride (VCrN), vanadium molybdenum nitride (VMoN), vanadium tungsten nitride (VWN), niobium tantalum nitride (NbTaN), niobium chromium nitride (NbCrN), niobium molybdenum nitride (NbMoN), niobium tungsten nitride (NbWN), tantalum chromium nitride (TaCrN), tantalum molybdenum nitride (TaMoN), tantalum tungsten nitride (TaWN), chromium molybdenum nitride (CrMoN), chromium tungsten nitride (CrWN), and molybdenum chromium nitride (MoWN).

Examples of the compound (carbide) including the first metal element(s) and carbon include titanium carbide (TiC), zirconium carbide (ZrC), hafnium carbide (HfC), vanadium carbide (VC), niobium carbide (NbC), tantalum carbide (TaC), chromium carbide ($Cr_3C_2$), molybdenum carbide (MoC), tungsten carbide (WC), silicon carbide (SiC), and tungsten cobalt carbide ($W_2Co_3C$).

Examples of the compound (boride) including the first metal element(s) and boron include titanium boride ($TiB_2$), zirconium boride ($ZrB_2$), hafnium boride ($HfB_2$), vanadium boride ($VB_2$), niobium boride ($NbB_2$), tantalum boride ($TaB_2$), chromium boride (CrB), molybdenum boride (MoB), tungsten boride (WB), aluminum boride ($AlB_2$), cobalt boride ($Co_2B$), and nickel boride ($Ni_2B$).

Examples of the compound (oxide) including the first metal element(s) and oxygen include titanium oxide ($TiO_2$), zirconium oxide ($ZrO_2$), hafnium oxide ($HfO_2$), vanadium oxide ($V_2O_5$), niobium oxide ($Nb_2O_5$), tantalum oxide ($Ta_2O_5$), chromium oxide ($Cr_2O_3$), molybdenum oxide ($MoO_3$), tungsten oxide ($WO_3$), aluminum oxide ($Al_2O_3$), silicon oxide ($SiO_2$), cobalt oxide (CoO), and nickel oxide (NiO).

Examples of the compound (carbonitride) including the first metal element(s), carbon, and nitrogen include titanium carbonitride (TiCN), zirconium carbonitride (ZrCN), hafnium carbonitride (HfCN), titanium niobium carbonitride (TiNbCN), titanium zirconium carbonitride (TiZrCN), titanium tantalum carbonitride (TiTaCN), titanium hafnium carbonitride (TiHfCN), and titanium chromium carbonitride (TiCrCN).

Examples of the compound (oxynitride) composed of the first metal element(s), oxygen, and nitrogen include titanium oxynitride (TiON), zirconium oxynitride (ZrON), hafnium oxynitride (HfON), vanadium oxynitride (VON), niobium oxynitride (NbON), tantalum oxynitride (TaON), chromium oxynitride (CrON), molybdenum oxynitride (MoON), tungsten oxynitride (WON), aluminum oxynitride (AlON), and silicon oxynitride (SiAlON).

The solid solution originated from the compound refers to a state in which two or more of the compounds illustrated above are dissolved in the crystal structures of the compounds, and refers to an interstitial solid solution or a substitutional solid solution.

One of the above-described compounds may be solely used or two or more of the above-described compounds may be used in combination.

The lower limit of the total content of the compound and the solid solution originated from the compound in the binder phase is preferably more than or equal to 10 volume %, is more preferably more than or equal to 20 volume %, and is further preferably more than or equal to 30 volume %. The upper limit of the total content of the compound and the solid solution originated from the compound in the binder phase is preferably less than or equal to 70 volume %, is more preferably less than or equal to 60 volume %, and is most preferably 50 volume %. The total content of the compound and the solid solution originated from the compound in the binder phase is preferably more than or equal to 10 volume % and less than or equal to 70 volume %, is more preferably more than or equal to 20 volume % and less than or equal to 60 volume %, and is further preferably more than or equal to 30 volume % and less than or equal to 50 volume %.

The total content of the binder phase compound and the solid solution originated from the binder phase compound in the binder phase is measured by a RIR method (Reference Intensity Ratio) employing XRD.

The binder phase may include other component(s) in addition to the binder phase compound(s). Examples of elements constituting the other component(s) include manganese (Mn) and rhenium (Re).

The composition of the binder phase included in the cBN sintered material can be specified by XRD (X-ray Diffraction measurement).

<Application>

The cubic boron nitride sintered material of the present disclosure is suitably used for a cutting tool, a wear-resistant tool, a grinding tool, or the like.

Each of the cutting tool, the wear-resisting tool and the grinding tool employing the cubic boron nitride sintered material of the present disclosure may be entirely constituted of the cubic boron nitride sintered material, or only a portion thereof (for example, a cutting edge portion in the case of the cutting tool) may be constituted of the cubic boron nitride sintered material. Moreover, a coating film may be formed on a surface of each of the tools.

Examples of the cutting tool include a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

Examples of the wear-resistant tool include a die, a scriber, a scribing wheel, a dresser, and the like. Examples of the grinding tool include a grinding stone and the like.

<<Method for Manufacturing Cubic Boron Nitride Sintered Material>>

The cubic boron nitride sintered material of the present disclosure can be produced by the following method, for example.

First, cubic boron nitride powder (hereinafter, also referred to as "cBN powder") and binder material powder are prepared.

(Preparation of cBN powder)

The cBN powder is material powder for the cBN grains included in the cBN sintered material. The cBN powder is not particularly limited and known cBN powder can be used. Particularly, the cBN powder is preferably obtained in the following manner: hexagonal boron nitride powder is held in a thermodynamically stable region of cubic boron nitride under presence of a catalyst, $LiCaBN_2$, so as to convert the hexagonal boron nitride powder into cubic boron nitride powder.

The dislocation density of the cBN powder can be increased by using, for example, the following methods (a) to (c).

(a) As described above, the synthesis time is made shorter when converting the hexagonal boron nitride powder into the cubic boron nitride powder under presence of the catalyst. Accordingly, the obtained cBN powder has particle sizes comparable to those of the cBN powder obtained by the above-described method, and has an increased dislocation density.

(b) The obtained cBN powder above is pulverized in a wet manner using a ball mill (a cemented carbide container and a cemented carbide ball), thereby obtaining cBN powder having a desired average particle size. $D_{50}$ (average particle size) of the cBN powder is not particularly limited, and can be 0.1 to 12.0 µm, for example.

The cBN powder is introduced into a capsule composed of Ta (tantalum), and is subjected to a pressure application treatment. In the pressure application treatment, a pressure of more than or equal to 3 GPa and less than or equal to 10 GPa is applied to the cBN powder under a normal temperature for more than or equal to 5 minutes and less than or equal to 60 minutes. Accordingly, the dislocation density of cBN is increased.

(c) The obtained cBN powder above is pulverized using a high energy type ball mill having an agitator arm (for example, "Attritor" (trademark) provided by Nippon Coke & Engineering). Accordingly, the dislocation density of the cBN powder is increased.

The dislocation density in the sintered material can be also increased by setting a slow pressure increasing rate during sintering of a below-described powder mixture of the cBN powder and the binder material powder.

(Preparation of Binder Material Powder)

The binder material powder is material powder for the binder phase included in the cBN sintered material. The binder material powder can be prepared as follows, for example. WC powder, Co powder, and Al powder are mixed at a mass ratio of 3:8:1, and the mixture is subjected to heat treatment at 1200° C. for 30 minutes in vacuum, thereby obtaining a compound including WC, Co, and Al. The compound is pulverized to produce the binder material powder.

It should be noted that the method for mixing and pulverizing each powder is not particularly limited; however, in order to mix them efficiently and uniformly, mixing and pulverization using a medium such as a ball, jet mill mixing and pulverization, or the like is preferable. Each of the mixing and pulverization methods may be of wet type or dry type.

(Preparation of Powder Mixture)

The cBN powder and binder material powder prepared above are mixed through wet type ball mill mixing employing ethanol, acetone, or the like for a solvent, thereby producing a powder mixture. The solvent is removed by natural drying after the mixing. Then, heat treatment is performed to volatilize an impurity, such as moisture, on the surface of the powder mixture, thereby cleaning the surface of the powder mixture.

In addition to WC, Co, and Al, the above-described binder material powder can include at least one metal selected from Fe, Ni, Si, Cr, Ti, V, Zr, Nb, Mo, Hf, Ta, and W, an alloy of the metal, and carbide, oxide, nitride, and carbonitride of the metal.

(Sintering Step)

The powder mixture is introduced into a container composed of Ta (tantalum) so as to be in contact with a WC-6% Co cemented carbide disc and a Co (cobalt) foil, and the container is then vacuum-sealed. The powder mixture in the vacuum-sealed container is held at 3 to 9 GPa and 1100 to 1900° C. for 5 to 30 minutes using a belt type ultra-high-pressure and high-temperature generation device, thereby sintering the powder mixture. Here, the dislocation density in the sintered material can be increased by setting a slow pressure increasing rate. Accordingly, the cubic boron nitride sintered material of the present disclosure is produced.

EXAMPLES

The following describes the present embodiment more specifically by way of examples. However, the present embodiment is not limited by these examples.

Example 1

(Sample 1-1)

First, cubic boron nitride powder was prepared in the following procedure.

10 parts by mass of $LiCaBN_2$ serving as a catalyst was blended with respect to 100 parts by mass of hexagonal boron nitride powder, and they were held for 30 minutes at 5 GPa and 1450° C., thereby synthesizing cubic boron nitride powder (cBN powder). The obtained cBN powder was pulverized in a wet manner for 90 hours using a ball mill (a stainless steel container and a stainless steel ball), thereby obtaining cBN powder having an average particle size (median size d50 of the equivalent circle diameters) of 3 μm.

The cBN powder was introduced into a capsule composed of Ta (tantalum) and a pressure of 7 GPa was applied thereto for 60 minutes at a normal temperature.

Next, binder material powder was prepared in the following procedure.

WC powder, Co powder, and Al powder were prepared at a mass ratio of 3:8:1. Zr powder was added to and mixed with the WC powder, the Co powder, and the Al powder such that the Zr powder was 5 mass % with respect to the whole of them, was subjected to heat treatment at 1200° C. for 30 minutes in vacuum, and was then mixed and pulverized using a wet type ball mill, thereby producing binder material powder including WC, Co, Al, and Zr.

The cBN powder and the binder material powder were blended at a volume ratio of 95:5, and were mixed uniformly by the wet type ball mill method using ethanol, thereby obtaining a powder mixture. Then, degassing treatment was performed at 900° C. in vacuum to remove an impurity such as moisture on a surface thereof.

Next, the powder mixture was introduced into a container composed of Ta (tantalum) so as to be in contact with a WC-6% Co cemented carbide disc and a Co (cobalt) foil, and the container was then vacuum-sealed. The pressure of the powder mixture in the vacuum-sealed container was increased to 7 GPa at a pressure increasing rate of 0.4 GPa/min using a belt type ultra-high-pressure and high-temperature generation device, was held for 20 minutes at 7 GPa and 1700° C. for the purpose of sintering, thereby obtaining a cBN sintered material of a sample 1-1.

(Samples 1-2 to 1-6)

Each of cBN sintered materials was produced in the same manner as in sample 1-1 except that the conditions of the pressure application treatment to the cBN powder were changed to conditions described in the columns "Pressure (GPa)" and "(Time)" of "Pressure Application Treatment" in Table 1-1.

(Samples 1-7 to 1-12)

Each of cBN sintered materials was produced in the same manner as in sample 1-6 except that when synthesizing the cBN powder, the holding time at 5 GPa and 1450° C. was changed to a holding time described in the column "Catalyst and Holding Time" of the "cBN Powder Synthesis" of Table 1-1.

(Sample 1-13)

A cBN sintered material was produced in the same manner as in sample 1-6 except that Cr powder was added instead of the Zr powder when producing the binder powder.

(Sample 1-14)

A cBN sintered material was produced in the same manner as in sample 1-6 except that Ni powder and Nb powder were added instead of the Zr powder when producing the binder powder. It should be noted that the mass ratio of the Ni powder and the Nb powder was Ni:Nb=1:1.

(Sample 1-15)

A cBN sintered material was produced in the same manner as in sample 1-6 except that the Zr powder was not added when producing the binder powder and ZrN powder was added when mixing the cBN powder with the binder powder. It should be noted that the amount of addition of the ZrN powder was set such that the content ratio thereof with respect to the whole of the binder was 5 weight %.

(Sample 1-16)

A cBN sintered material was produced in the same manner as in sample 1-6 except that the Zr powder was not added when producing the binder powder and CrN powder was added when mixing the cBN powder with the binder powder. It should be noted that the amount of addition of the CrN powder was set such that the content ratio thereof with respect to the whole of the binder was 5 weight %. The CrN powder was obtained by performing treatment onto $Cr_2N$ (provided by Japan New Metals) at 300 kPa and 900° C. for 3 hours under a nitrogen atmosphere.

(Sample 1-17)

A cBN sintered material was produced in the same manner as in sample 1-6 except that during the sintering of the powder mixture, the pressure was increased to 10 GPa at a pressure increasing rate of 0.4 GPa/min and the powder mixture was held for 20 minutes at 10 GPa and 1700° C. for the purpose of sintering.

(Sample 1-18)

A cBN sintered material was produced in the same manner as in sample 1-6 except that: the volume ratio of the cBN powder and the binder powder was 90:10; and during the sintering of the powder mixture, the pressure was increased to 6.5 GPa at a pressure increasing rate of 0.4 GPa/min and the powder mixture was held for 20 minutes at 6.5 GPa and 1700° C. for the purpose of sintering.

(Sample 1-19)

A cBN sintered material was produced in the same manner as in sample 1-6 except that: the volume ratio of the cBN powder and the binder powder was 90:10; and during the sintering of the powder mixture, the pressure was increased to 5.5 GPa at a pressure increasing rate of 0.4 GPa/min and the powder mixture was held for 20 minutes at 5.5 GPa and 1700° C. for the purpose of sintering.

(Sample 1-20)

A cBN sintered material was produced in the same manner as in sample 1-6 except that during the sintering of the powder mixture, the pressure was increased to 15 GPa at a pressure increasing rate of 0.4 GPa/min and the powder mixture was held for 20 minutes at 15 GPa and 1700° C. for the purpose of sintering.

(Sample 1-21)

A cBN sintered material was produced in the same manner as in sample 1-6 except that the conditions of the pressure application treatment to the cBN powder were changed to conditions described in the columns "Pressure (GPa)" and "(Time)" of "Pressure Application Treatment" in Table 1-1.

(Sample 1-22)

A cBN sintered material was produced in the same manner as in sample 1-6 except that during the production of the cBN powder, $LiBN_2$ was used instead of $LiCaBN_2$.

(Sample 1-23)

A cBN sintered material was produced in the same manner as in sample 1-6 except that: the volume ratio of the cBN powder and the binder powder was 80:20; and during the sintering of the powder mixture, the pressure was increased to 5.5 GPa at a pressure increasing rate of 0.4 GPa/min and the powder mixture was held for 20 minutes at 5.5 GPa and 1350° C. for the purpose of sintering.

(Sample 1-24)

A cBN sintered material was produced in the same manner as in sample 1-6 except that no pressure application treatment was performed onto the cBN powder.

(Sample 1-25)

A cBN sintered material was produced in the same manner as in sample 1-6 except that: only the cBN powder was sintered without using the binder powder; the WC-6% Co cemented carbide disc and the Co (cobalt) foil were not used during the sintering; and during the sintering of the cBN powder, the pressure was increased to 15 GPa at a pressure increasing rate of 0.4 GPa/min, and the cBN powder was held for 20 minutes at 15 GPa and 1800° C. for the purpose of sintering.

(Sample 1-26)

A cBN sintered material was produced in the same manner as in sample 1-6 except that: only the cBN powder was sintered without using the binder powder; and an Al plate was used instead of the WC-6% Co cemented carbide disc and the Co (cobalt) foil during the sintering.

(Sample 1-27)

A cBN sintered material was produced in the same manner as in sample 1-6 except that: powder in which Co powder and Al powder were mixed at a mass ratio of 7.5:1 was prepared as the binder powder; a powder mixture was produced by blending the cBN powder and the binder powder at a ratio of 90:10; and no cemented carbide disc was used during the sintering of the powder mixture. It should be noted that during the sintering, Co and Al were dissolved in the solid state to form a Co-Al alloy.

(Sample 1-28)

A cBN sintered material was produced in the same manner as in sample 1-6 except that attritor (used device: "Attritor" (trademark) provided by Nippon Coke & Engineering; MS01SC type) pulverization (ball composed of a cemented carbide) was performed after the synthesis of the cBN powder, instead of the pulverization with ball milling; and no pressure application treatment was performed.

(Sample 1-29)

A cBN sintered material was produced in the same manner as in sample 1-6 except that: no pressure application treatment was performed after the synthesis of the cBN powder; the pressure was increased to 7 GPa at a pressure increasing rate of 0.2 GPa/min during the sintering of the powder mixture; and the powder mixture was held for 5 minutes at 7 GPa and 1700° C. for the purpose of sintering.

(Sample 1-30)

A cBN sintered material was produced in the same manner as in sample 1-6 except that: the holding time at 5 GPa and 1450° C. was changed to 1 minute when synthesizing the cBN powder; and the obtained cBN powder was not subjected to the pulverization and the pressure application treatment.

<Evaluation>

(Composition of cBN Sintered Material)

The volume ratio of the cBN grains and the binder phase in each of the cBN sintered materials was measured. A specific measurement method is the same as the one described in the DETAILED DESCRIPTION, and therefore will not be repeatedly described. Results thereof are shown in the columns "cBN Grains (Volume %)" and "Binder Phase (Volume %)" of Table 1-2.

As a result of the measurements, in each of samples 1-1 to 1-16, 1-18 to 1-24, 1-26, and 1-28 to 1-30, the volume ratio of the cBN powder and the binder powder in the powder mixture is different from the volume ratio of the cBN grains and the binder phase in the cubic boron nitride sintered material. This is presumably due to the following reasons.

In each of samples 1-1 to 1-16, 1-18, 1-19, 1-21 to 1-24, and 1-28 to 1-30, it is considered that since the powder mixture is sintered in contact with the WC-6% Co cemented carbide disc, a cemented carbide component flows into the powder mixture during the sintering, with the result that the cemented carbide component exists as a binder phase in the obtained cBN sintered material.

It should be noted that the cemented carbide disc is used in the case of sample 1-17; however, it is considered that since there is no space between material powders into which a cemented carbide component flows due to the high-pressure sintering at 10 GPa, the volume ratio of the cBN powder and the binder powder in the powder mixture is the same as the volume ratio of the cBN grains and the binder phase in the cubic boron nitride sintered material.

In sample 1-20, it is considered that due to the ultra-high pressure sintering at 15 GPa, the added binder and a binder component to flow in are pushed out of the sintered material during the sintering.

In sample 1-26, it is considered that since the powder mixture is sintered in contact with the Al plate, Al flows into the powder mixture during the sintering, with the result that Al exists as a binder phase in the obtained cBN sintered material.

(Composition of Binder Phase)

The composition of the binder phase in the cBN sintered material was specified by XRD. Results thereof are shown in the column "Composition" of "Binder Phase" of Table 1-2.

(Dislocation Density)

The dislocation density of the cBN grains in the cBN sintered material was measured. A specific measurement method is the same as the one described in the DETAILED DESCRIPTION, and therefore will not be repeatedly described. Results thereof are shown in the column "Dislocation Density" of Table 1-2.

(Calcium Content)

The calcium content of the cBN grain in the cBN sintered material was measured by ICP analysis. A specific measurement method is the same as the one described in the DETAILED DESCRIPTION, and therefore will not be repeatedly described. Results thereof are shown in the column "Ca Content of cBN Grain" of Table 1-2.

(Cutting Test)

A cutting tool (substrate shape: CNGA120408; cutting edge process: T01215) was produced using the cBN sintered material of each produced sample. A cutting test was performed using this cutting tool under the following cutting conditions. The cutting conditions described below correspond to cutting of a sintered alloy.

Cutting speed: 150 m/min.

Feeding speed: 0.05 mm/rev.

Depth of cut: 0.1 mm

Coolant: DRY

Cutting method: outer diameter intermittent cutting

Lathe: LB4000 (provided by OKUMA Corporation)

Workpiece: gear-shaped sintered component (an induction-hardened gear portion of a sintered alloy provided by Sumitomo Electric Industries (hardness HV500) with its outer diameter to be cut)

Evaluation method: the cutting edge is observed for each 0.5 km to measure an amount of a flank wear and a breakage width, and a graph is drawn to indicate changes in wear amount and breakage width with respect to the cutting distance. A line is drawn in the graph to indicate a wear amount or breakage width of 150 μm. A cutting distance at an intersection between the line and the graph indicating the change of the wear amount or the breakage width is read as a tool life. Results thereof are shown in the column "Tool Life" of Table 1-2. It is indicated that as the tool life is longer, the wear resistance and breakage resistance are more excellent.

TABLE 1-1

| Sample No. | Binder Material cBN Powder (Volume %) | Binder Material Powder (Volume %) | Pressure Application Treatment Pressure (GPa) | Pressure Application Treatment (Time) | cBN Powder Synthesis Catalyst and Holding Time | cBN Pulverization Method and Treatment Time | Sintering Condition Pressure Increasing Rate and Holding Time |
|---|---|---|---|---|---|---|---|
| 1-1 | 95 | 5 | 7 | 60 | LiCaBN$_2$, 30 min | Ball Mill, 90 h | 0.4 GPa/min, 20 min |
| 1-2 | 95 | 5 | 7 | 5 | LiCaBN$_2$, 30 min | Ball Mill, 90 h | 0.4 GPa/min, 20 min |
| 1-3 | 95 | 5 | 7 | 40 | LiCaBN$_2$, 30 min | Ball Mill, 90 h | 0.4 GPa/min, 20 min |
| 1-4 | 95 | 5 | 7 | 10 | LiCaBN$_2$, 30 min | Ball Mill, 90 h | 0.4 GPa/min, 20 min |
| 1-5 | 95 | 5 | 7 | 20 | LiCaBN$_2$, 30 min | Ball Mill, 90 h | 0.4 GPa/min, 20 min |
| 1-6 | 95 | 5 | 7 | 15 | LiCaBN$_2$, 30 min | Ball Mill, 90 h | 0.4 GPa/min, 20 min |
| 1-7 | 95 | 5 | 7 | 15 | LiCaBN$_2$, 60 min | Ball Mill, 90 h | 0.4 GPa/min, 20 min |
| 1-8 | 95 | 5 | 7 | 15 | LiCaBN$_2$, 5 min | Ball Mill, 90 h | 0.4 GPa/min, 20 min |
| 1-9 | 95 | 5 | 7 | 15 | LiCaBN$_2$, 50 min | Ball Mill, 90 h | 0.4 GPa/min, 20 min |
| 1-10 | 95 | 5 | 7 | 15 | LiCaBN$_2$, 10 min | Ball Mill, 90 h | 0.4 GPa/min, 20 min |
| 1-11 | 95 | 5 | 7 | 15 | LiCaBN$_2$, 40 min | Ball Mill, 90 h | 0.4 GPa/min, 20 min |
| 1-12 | 95 | 5 | 7 | 15 | LiCaBN$_2$, 20 min | Ball Mill, 90 h | 0.4 GPa/min, 20 min |
| 1-13 | 95 | 5 | 7 | 15 | LiCaBN$_2$, 30 min | Ball Mill, 90 h | 0.4 GPa/min, 20 min |
| 1-14 | 95 | 5 | 7 | 15 | LiCaBN$_2$, 30 min | Ball Mill, 90 h | 0.4 GPa/min, 20 min |
| 1-15 | 95 | 5 | 7 | 15 | LiCaBN$_2$, 30 min | Ball Mill, 90 h | 0.4 GPa/min, 20 min |
| 1-16 | 95 | 5 | 7 | 15 | LiCaBN$_2$, 30 min | Ball Mill, 90 h | 0.4 GPa/min, 20 min |
| 1-17 | 95 | 5 | 7 | 15 | LiCaBN$_2$, 30 min | Ball Mill, 90 h | 0.4 GPa/min, 20 min |
| 1-18 | 90 | 10 | 7 | 15 | LiCaBN$_2$, 30 min | Ball Mill, 90 h | 0.4 GPa/min, 20 min |
| 1-19 | 90 | 10 | 7 | 15 | LiCaBN$_2$, 30 min | Ball Mill, 90 h | 0.4 GPa/min, 20 min |
| 1-20 | 95 | 5 | 7 | 15 | LiCaBN$_2$, 30 min | Ball Mill, 90 h | 0.4 GPa/min, 20 min |
| 1-21 | 95 | 5 | 10 | 30 | LiCaBN$_2$, 30 min | Ball Mill, 90 h | 0.4 GPa/min, 20 min |
| 1-22 | 95 | 5 | 7 | 15 | LiBN$_2$ | Ball Mill, 90 h | 0.4 GPa/min, 20 min |
| 1-23 | 80 | 20 | 7 | 15 | LiCaBN$_2$, 30 min | Ball Mill, 90 h | 0.4 GPa/min, 20 min |
| 1-24 | 95 | 5 | — | — | LiCaBN$_2$, 30 min | Ball Mill, 90 h | 0.4 GPa/min, 20 min |
| 1-25 | 100 | — | 7 | 15 | LiCaBN$_2$, 30 min | Ball Mill, 90 h | 0.4 GPa/min, 20 min |
| 1-26 | 100 | — | 7 | 15 | LiCaBN$_2$, 30 min | Ball Mill, 90 h | 0.4 GPa/min, 20 min |
| 1-27 | 90 | 10 | 7 | 15 | LiCaBN$_2$, 30 min | Ball Mill, 90 h | 0.4 GPa/min, 20 min |
| 1-28 | 95 | 5 | — | — | LiCaBN$_2$, 30 min | Attritor, 10 h | 0.4 GPa/min, 20 min |
| 1-29 | 95 | 5 | — | — | LiCaBN$_2$, 30 min | Ball Mill, 90 h | 0.2 GPa/min, 5 min |
| 1-30 | 95 | 5 | — | — | LiCaBN$_2$, 1 min | No Pulverization | 0.4 GPa/min, 20 min |

TABLE 1-2

| Sample No. | cBN Sintered Material cBN Grains (Volume %) | Binder Phase (Volume %) | Binder Phase Composition | Dislocation Density (/m$^2$) | Ca Content of cBN Grain (Mass %) | Cutting Test Tool Life (km) |
|---|---|---|---|---|---|---|
| 1-1 | 90 | 10 | WC, Co, Al$_2$O$_3$, Zr | $1.00 \times 10^{20}$ | 0.1 | 2.8 |
| 1-2 | 90 | 10 | WC, Co, Al$_2$O$_3$, Zr | $3.00 \times 10^{17}$ | 0.1 | 2.7 |
| 1-3 | 90 | 10 | WC, Co, Al$_2$O$_3$, Zr | $9.50 \times 10^{19}$ | 0.1 | 3.2 |
| 1-4 | 90 | 10 | WC, Co, Al$_2$O$_3$, Zr | $5.00 \times 10^{17}$ | 0.1 | 3 |
| 1-5 | 90 | 10 | WC, Co, Al$_2$O$_3$, Zr | $9.00 \times 10^{19}$ | 0.1 | 3.3 |
| 1-6 | 90 | 10 | WC, Co, Al$_2$O$_3$, Zr | $8.00 \times 10^{17}$ | 0.1 | 3.5 |
| 1-7 | 90 | 10 | WC, Co, Al$_2$O$_3$, Zr | $8.00 \times 10^{17}$ | 0.2 | 2.6 |
| 1-8 | 90 | 10 | WC, Co, Al$_2$O$_3$, Zr | $8.00 \times 10^{17}$ | 0.02 | 2.7 |
| 1-9 | 90 | 10 | WC, Co, Al$_2$O$_3$, Zr | $8.00 \times 10^{17}$ | 0.17 | 3 |
| 1-10 | 90 | 10 | WC, Co, Al$_2$O$_3$, Zr | $8.00 \times 10^{17}$ | 0.05 | 3.2 |
| 1-11 | 90 | 10 | WC, Co, Al$_2$O$_3$, Zr | $8.00 \times 10^{17}$ | 0.15 | 3.4 |
| 1-12 | 90 | 10 | WC, Co, Al$_2$O$_3$, Zr | $8.00 \times 10^{17}$ | 0.07 | 3.3 |
| 1-13 | 90 | 10 | WC, Co, Al$_2$O$_3$, Cr | $8.00 \times 10^{17}$ | 0.1 | 3.6 |
| 1-14 | 90 | 10 | WC, Co, Al$_2$O$_3$, Ni, Nb | $8.00 \times 10^{17}$ | 0.1 | 3.4 |
| 1-15 | 90 | 10 | WC, Co, Al$_2$O$_3$, ZrN | $8.00 \times 10^{17}$ | 0.1 | 3.4 |
| 1-16 | 90 | 10 | WC, Co, Al$_2$O$_3$, CrN | $8.00 \times 10^{17}$ | 0.1 | 3.4 |
| 1-17 | 95 | 5 | WC, Co, Al$_2$O$_3$, CrN | $8.00 \times 10^{17}$ | 0.1 | 3.5 |
| 1-18 | 85 | 15 | WC, Co, Al$_2$O$_3$, CrN | $8.00 \times 10^{17}$ | 0.1 | 3.2 |
| 1-19 | 81 | 20 | WC, Co, Al$_2$O$_3$, CrN | $8.00 \times 10^{17}$ | 0.1 | 3 |
| 1-20 | 99 | 1 | WC, Co, Al$_2$O$_3$, CrN | $8.00 \times 10^{17}$ | 0.1 | 3.6 |
| 1-21 | 90 | 10 | WC, Co, Al$_2$O$_3$, Zr | $2.00 \times 10^{20}$ | 0.1 | 1 |
| 1-22 | 90 | 10 | WC, Co, Al$_2$O$_3$, Zr | $8.00 \times 10^{17}$ | <0.001 | 2.5 |
| 1-23 | 78 | 22 | WC, Co, Al$_2$O$_3$, Zr | $8.00 \times 10^{17}$ | 0.1 | 0.9 |
| 1-24 | 90 | 10 | WC, Co, Al$_2$O$_3$, Zr | $2.00 \times 10^{17}$ | 0.1 | 0.8 |
| 1-25 | 100 | — | — | $8.00 \times 10^{17}$ | 0.1 | 1 |
| 1-26 | 98 | 2 | Al$_2$O$_3$, AlN | $8.00 \times 10^{17}$ | 0.1 | 2.6 |
| 1-27 | 90 | 10 | CoAl | $8.00 \times 10^{17}$ | 0.1 | 2.5 |

TABLE 1-2-continued

| | cBN Sintered Material | | | | | |
|---|---|---|---|---|---|---|
| Sample | cBN Grains | Binder Phase | | Dislocation Density | Ca Content of cBN Grain | Cutting Test Tool Life |
| No. | (Volume %) | (Volume %) | Composition | ($/m^2$) | (Mass %) | (km) |
| 1-28 | 90 | 10 | WC, Co, $Al_2O_3$, Zr | $7.80 \times 10^{17}$ | 0.1 | 3.5 |
| 1-29 | 90 | 10 | WC, Co, $Al_2O_3$, Zr | $7.90 \times 10^{17}$ | 0.1 | 3.5 |
| 1-30 | 90 | 10 | WC, Co, $Al_2O_3$, Zr | $1.0 \times 10^{18}$ | 0.1 | 3.4 |

<Analysis>

Each of the cBN sintered materials of samples 1-1 to 1-20, 1-22 and 1-26 to 1-30 corresponds to an example of the present disclosure.

The cBN sintered material of sample 1-21, in which the dislocation density of the cBN grains is more than $1 \times 10^{20}/m^2$, corresponds to a comparative example.

The cBN sintered material of sample 1-23, in which the volume ratio of the cBN grains is less than or equal to 80 volume %, corresponds to a comparative example.

The cBN sintered material of sample 1-24, in which the dislocation density of the cBN grains is less than $3 \times 10^{17}/m^2$, corresponds to a comparative example.

The cBN sintered material of sample 1-25, in which the volume ratio of the cBN grains is 100 volume %, corresponds to a comparative example.

In the cutting of the sintered alloy, it was confirmed that each of samples 1-1 to 1-20, 1-22 and 1-26 to 1-30 corresponding to the examples of the present disclosure has a tool life longer than that of each of samples 1-21, 1-23, 1-24, and 1-25 corresponding to the comparative examples. This is presumably because each of samples 1-1 to 1-20, 1-22, and 1-26 to 1-30 corresponding to the examples of the present disclosure have excellent breakage resistance.

Example 2

(Sample 2-1)

First, cubic boron nitride powder was prepared in the following procedure.

10 parts by mass of $LiCaBN_2$ serving as a catalyst was blended with respect to 100 parts by mass of hexagonal boron nitride powder, and they were held for 30 minutes at 5 GPa and 1450° C., thereby synthesizing cubic boron nitride powder (cBN powder). The obtained cBN powder was pulverized in a wet manner using a ball mill (a stainless steel container and a stainless steel ball), thereby obtaining cBN powder having an average particle size (median size d50 of the equivalent circle diameters) of 3 μm.

The cBN powder was introduced into a capsule composed of Ta (tantalum) and a pressure of 7 GPa was applied thereto for 60 minutes at a normal temperature.

Titanium (Ti) powder, aluminum (Al) powder, and TiN powder (provided by Kennametal) were mixed at a mass ratio of 37:22:41, and was subjected to heat treatment for 60 minutes at 1500° C. under an argon atmosphere, thereby obtaining a single-phase compound having a composition of $Ti_2AlN$. By mixing and pulverizing the single-phase compound using a wet type ball mill, $Ti_2AlN$ powder having a particle size (D50) of 0.5 μm was obtained.

The TiN powder and the $Ti_2AlN$ powder were mixed at a mass ratio of 1:2, thereby obtaining binder powder. The cBN powder and the binder powder were mixed at a volume ratio of 82:18, and was mixed uniformly using a ball mill, thereby obtaining a powder mixture.

Next, the powder mixture was introduced into a container composed of Ta (tantalum) and the container was vacuum-sealed. The powder mixture in the vacuum-sealed container was sintered by maintaining the powder mixture at 6.5 GPa and 1500° C. for 15 minutes using a belt type ultra-high-pressure and high-temperature generation device, thereby obtaining a cBN sintered material of sample 2-1. In the sintering step, cBN and $Ti_2AlN$ were reacted with each other to generate $TiB_2$, and $Al_2O_3$.

(Samples 2-2 to 2-6)

Each of cBN sintered materials was produced in the same manner as in sample 2-1 except that the conditions of the pressure application treatment to the cBN powder were changed to conditions described in the columns "Pressure (GPa)" and "(Time)" of "Pressure Application Treatment" in Table 2-1.

(Samples 2-7 to 2-12)

Each of cBN sintered materials was produced in the same manner as in sample 2-6 except that when producing cBN powder, the holding time at 5 GPa and 1450° C. was changed to a holding time described in the column "Catalyst and Holding Time" of "cBN Powder Synthesis" of Table 2-1.

(Sample 2-13)

A cBN sintered material was produced in the same manner as in sample 2-6 except that when producing the binder powder, ZrN powder (provided by Japan New Metals) was used instead of the TiN powder.

(Sample 2-14)

A cBN sintered material was produced in the same manner as in sample 2-6 except that when producing the binder powder, HfN powder (provided by Japan New Metals) was used instead of the TiN powder.

(Sample 2-15)

A cBN sintered material was produced in the same manner as in sample 2-6 except that when producing the binder powder, VN powder (provided by Japan New Metals) was used instead of TiN powder.

(Sample 2-16)

A cBN sintered material was produced in the same manner as in sample 2-6 except that when producing the binder powder, NbN powder (provided by Japan New Metals) was used instead of TiN powder.

(Sample 2-17)

A cBN sintered material was produced in the same manner as in sample 2-6 except that when producing the binder powder, TaN powder (provided by Japan New Metals) was used instead of TiN powder.

(Sample 2-18)

A cBN sintered material was produced in the same manner as in sample 2-6 except that when producing the binder powder, $Cr_2N$ powder (provided by Japan New Metals) was used instead of TiN powder.

(Sample 2-19)

A cBN sintered material was produced in the same manner as in sample 2-6 except that when producing the binder powder, $Mo_2N$ powder (provided by Japan New Metals) was used instead of TiN powder.

(Sample 2-20)

A cBN sintered material was produced in the same manner as in sample 2-6 except that when producing the binder powder, $W_2N$ powder (provided by Japan New Metals) was used instead of TiN powder.

(Sample 2-21)

A cBN sintered material was produced in the same manner as in sample 2-6 except that when producing the binder powder, TiNbCN powder was used instead of the TiN powder. The TiNbCN powder was produced in the following procedure.

The $TiO_2$ powder, the $Nb_2O_5$ powder, and the carbon powder were mixed at a mass ratio of 62.10:11.48:26.42, and were subjected to heat treatment for 60 minutes at 2100° C. under a nitrogen atmosphere, thereby obtaining a single-phase compound having a composition of TiNbCN. By mixing and pulverizing the single-phase compound using a wet type ball mill, TiNbCN powder having a particle size (D50) of 0.5 μm was obtained.

(Sample 2-22)

A cBN sintered material was produced in the same manner as in sample 2-6 except that when producing the binder powder, TiZrCN powder was used instead of the TiN powder. The TiZrCN powder was produced in the following procedure.

The $TiO_2$ powder, the $ZrO_2$ powder, and the carbon powder were mixed at a mass ratio of 58.35:15.88:25.77, and were subjected to heat treatment for 60 minutes at 2100° C. under a nitrogen atmosphere, thereby obtaining a single-phase compound having a composition of TiZrCN. By mixing and pulverizing the single-phase compound using a wet type ball mill, TiZrCN powder having a particle size (D50) of 0.5 μm was obtained.

(Samples 2-23 to 2-25 and 2-28)

Each of cBN sintered materials was produced in the same manner as in sample 2-6 except that the volume ratio of the cBN powder and the binder powder was changed to a ratio described in "cBN Powder" and "Binder Material Powder" of Table 2-1.

(Sample 2-26)

A cBN sintered material was produced in the same manner as in sample 2-6 except that no pressure application treatment was performed onto the cBN powder.

(Sample 2-27)

A cBN sintered material was produced in the same manner as in sample 2-6 except that during the production of the cBN powder, $LiBN_2$ was used instead of Li $CaBN_2$.

(Sample 2-29)

Each of cBN sintered materials was produced in the same manner as in sample 2-6 except that the conditions of the pressure application treatment to the cBN powder were changed to conditions described in the columns "Pressure (GPa)" and "(Time)" of "Pressure Application Treatment" in Table 2-1.

<Evaluation>

(Checking as to Composition of cBN Sintered Material, Composition of Binder Phase, Carbon Content of cBN Grain, Calcium Content of cBN Grain, and Presence/Absence of Free Carbon)

Each of the produced cBN sintered materials was checked as to the composition of the cBN sintered material, the composition of the binder phase, the carbon content of the cBN grain, the calcium content of the cBN grain, and presence/absence of free carbon. A specific measurement method is the same as the one described in the DETAILED DESCRIPTION, and therefore will not be repeatedly described. Results thereof are shown in Table 2-2.

(Cutting Test)

Each of the produced cBN sintered materials of the samples was used to produce a cutting tool having a cutting edge composed of the cBN sintered material (substrate shape: DNGA150412; cutting edge process: S01225). A cutting test was performed using this cutting tool under the following cutting conditions. The cutting conditions described below correspond to cutting of a high-strength hardened steel.

Cutting speed: 200 m/min.
Feeding speed: 0.15 mm/rev.
Depth of cut: 0.15 mm
Coolant: DRY
Cutting method: strong intermittent cutting
Lathe: LB4000 (provided by OKUMA Corporation)
Workpiece: hardened steel (SCM415; carburized and hardened; hardness 60HRC; intermittent cutting for U grooves at its outer circumference portion; the number of grooves is 5)

Evaluation method: the cutting edge is observed for each 0.5 km to measure a breakage width, and a graph is drawn to indicate a change in breakage width with respect to the cutting distance. A line is drawn in the graph to indicate a breakage width of 200 μm. A cutting distance at an intersection between the line and the graph indicating the change of the breakage width is read as a tool life. Results thereof are shown in the column "Tool Life" of Table 2-2.

TABLE 2-1

| Sample No. | Binder Material | | Pressure Application Treatment | | cBN Powder Synthesis |
|---|---|---|---|---|---|
| | cBN Powder (Volume %) | Powder (Volume %) | Pressure (GPa) | (Time) | Catalyst and Holding Time |
| 2-1 | 82 | 18 | 7 | 60 | $LiCaBN_2$, 30 min |
| 2-2 | 82 | 18 | 7 | 5 | $LiCaBN_2$, 30 min |
| 2-3 | 82 | 18 | 7 | 40 | $LiCaBN_2$, 30 min |
| 2-4 | 82 | 18 | 7 | 10 | $LiCaBN_2$, 30 min |
| 2-5 | 82 | 18 | 7 | 20 | $LiCaBN_2$, 30 min |
| 2-6 | 82 | 18 | 7 | 15 | $LiCaBN_2$, 30 min |
| 2-7 | 82 | 18 | 7 | 15 | $LiCaBN_2$, 60 min |
| 2-8 | 82 | 18 | 7 | 15 | $LiCaBN_2$, 5 min |
| 2-9 | 82 | 18 | 7 | 15 | $LiCaBN_2$, 50 min |
| 2-10 | 82 | 18 | 7 | 15 | $LiCaBN_2$, 10 min |
| 2-11 | 82 | 18 | 7 | 15 | $LiCaBN_2$, 40 min |

TABLE 2-1-continued

| | Binder Material | | Pressure Application Treatment | | cBN Powder Synthesis |
|---|---|---|---|---|---|
| Sample No. | cBN Powder (Volume %) | Powder (Volume %) | Pressure (GPa) | (Time) | Catalyst and Holding Time |
| 2-12 | 82 | 18 | 7 | 15 | $LiCaBN_2$, 20 min |
| 2-13 | 82 | 18 | 7 | 15 | $LiCaBN_2$, 30 min |
| 2-14 | 82 | 18 | 7 | 15 | $LiCaBN_2$, 30 min |
| 2-15 | 82 | 18 | 7 | 15 | $LiCaBN_2$, 30 min |
| 2-16 | 82 | 18 | 7 | 15 | $LiCaBN_2$, 30 min |
| 2-17 | 82 | 18 | 7 | 15 | $LiCaBN_2$, 30 min |
| 2-18 | 82 | 18 | 7 | 15 | $LiCaBN_2$, 30 min |
| 2-19 | 82 | 18 | 7 | 15 | $LiCaBN_2$, 30 min |
| 2-20 | 82 | 18 | 7 | 15 | $LiCaBN_2$, 30 min |
| 2-21 | 82 | 18 | 7 | 15 | $LiCaBN_2$, 30 min |
| 2-22 | 82 | 18 | 7 | 15 | $LiCaBN_2$, 30 min |
| 2-23 | 85 | 15 | 7 | 15 | $LiCaBN_2$, 30 min |
| 2-24 | 90 | 10 | 7 | 15 | $LiCaBN_2$, 30 min |
| 2-25 | 95 | 5 | 7 | 15 | $LiCaBN_2$, 30 min |
| 2-26 | 82 | 18 | — | — | $LiCaBN_2$, 30 min |
| 2-27 | 82 | 18 | 7 | 15 | $LiBN_2$ |
| 2-28 | 75 | 25 | 7 | 15 | $LiCaBN_2$, 30 min |
| 2-29 | 82 | 18 | 10 | 30 | $LiCaBN_2$, 30 min |

TABLE 2-2

| | cBN Sintered Material | | | Dislocation Density | Ca Content of cBN Grain | Cutting Test Tool Life |
|---|---|---|---|---|---|---|
| | cBN Grains | Binder Phase | | | | |
| Sample No. | (Volume %) | (Volume %) | Composition | ($/m^2$) | (Mass %) | (km) |
| 2-1 | 82 | 18 | TiN, $TiB_2$, AlN, $Al_2O_3$ | $1.00 \times 10^{20}$ | 0.1 | 2.8 |
| 2-2 | 82 | 18 | TiN, $TiB_2$, AlN, $Al_2O_3$ | $3.00 \times 10^{17}$ | 0.1 | 2.7 |
| 2-3 | 82 | 18 | TiN, $TiB_2$, AlN, $Al_2O_3$ | $9.50 \times 10^{19}$ | 0.1 | 3.2 |
| 2-4 | 82 | 18 | TiN, $TiB_2$, AlN, $Al_2O_3$ | $5.00 \times 10^{17}$ | 0.1 | 3 |
| 2-5 | 82 | 18 | TiN, $TiB_2$, AlN, $Al_2O_3$ | $9.00 \times 10^{19}$ | 0.1 | 3.3 |
| 2-6 | 82 | 18 | TiN, $TiB_2$, AlN, $Al_2O_3$ | $8.00 \times 10^{17}$ | 0.1 | 3.5 |
| 2-7 | 82 | 18 | TiN, $TiB_2$, AlN, $Al_2O_3$ | $8.00 \times 10^{17}$ | 0.2 | 2.6 |
| 2-8 | 82 | 18 | TiN, $TiB_2$, AlN, $Al_2O_3$ | $8.00 \times 10^{17}$ | 0.02 | 2.7 |
| 2-9 | 82 | 18 | TiN, $TiB_2$, AlN, $Al_2O_3$ | $8.00 \times 10^{17}$ | 0.17 | 3 |
| 2-10 | 82 | 18 | TiN, $TiB_2$, AlN, $Al_2O_3$ | $8.00 \times 10^{17}$ | 0.05 | 3.2 |
| 2-11 | 82 | 18 | TiN, $TiB_2$, AlN, $Al_2O_3$ | $8.00 \times 10^{17}$ | 0.15 | 3.4 |
| 2-12 | 82 | 18 | TiN, $TiB_2$, AlN, $Al_2O_3$ | $8.00 \times 10^{17}$ | 0.07 | 3.3 |
| 2-13 | 82 | 18 | ZrN, $ZrB_2$, AlN, $Al_2O_3$ | $8.00 \times 10^{17}$ | 0.1 | 3.6 |
| 2-14 | 82 | 18 | HfN, AlN, $Al_2O_3$ | $8.00 \times 10^{17}$ | 0.1 | 3.4 |
| 2-15 | 82 | 18 | VN, AlN, $Al_2O_3$ | $8.00 \times 10^{17}$ | 0.1 | 3.4 |
| 2-16 | 82 | 18 | NbN, AlN, $Al_2O_3$ | $8.00 \times 10^{17}$ | 0.1 | 3.4 |
| 2-17 | 82 | 18 | TaN, AlN, $Al_2O_3$ | $8.00 \times 10^{17}$ | 0.1 | 3.3 |
| 2-18 | 82 | 18 | $Cr_2N$, AlN, $Al_2O_3$ | $8.00 \times 10^{17}$ | 0.1 | 3.2 |
| 2-19 | 82 | 18 | $Mo_2N$, AlN, $Al_2O_3$ | $8.00 \times 10^{17}$ | 0.1 | 3.1 |
| 2-20 | 82 | 18 | $W_2N$, AlN, $Al_2O_3$, | $8.00 \times 10^{17}$ | 0.1 | 3 |
| 2-21 | 82 | 18 | TiNbCN, $TiB_2$, AlN, $Al_2O_3$ | $8.00 \times 10^{17}$ | 0.1 | 3.4 |
| 2-22 | 82 | 18 | TiZrCN, $TiB_2$, AlN, $Al_2O_3$ | $8.00 \times 10^{17}$ | 0.1 | 3.35 |
| 2-23 | 85 | 15 | TiN, $TiB_2$, AlN, $Al_2O_3$ | $8.00 \times 10^{17}$ | 0.1 | 3.5 |
| 2-24 | 90 | 10 | TiN, $TiB_2$, AlN, $Al_2O_3$ | $8.00 \times 10^{17}$ | 0.1 | 3.2 |
| 2-25 | 95 | 5 | TiN, $TiB_2$, AlN, $Al_2O_3$ | $8.00 \times 10^{17}$ | 0.1 | 3 |
| 2-26 | 82 | 18 | TiN, $TiB_2$, AlN, $Al_2O_3$ | $2.00 \times 10^{17}$ | 0.1 | 1 |
| 2-27 | 82 | 18 | TiN, $TiB_2$, AlN, $Al_2O_3$ | $8.00 \times 10^{17}$ | <0.001 | 2.5 |
| 2-28 | 75 | 25 | TiN, $TiB_2$, AlN, $Al_2O_3$ | $8.00 \times 10^{17}$ | 0.1 | 0.9 |
| 2-29 | 82 | 18 | TiN, $TiB_2$, AlN, $Al_2O_3$ | $3.00 \times 10^{20}$ | 0.1 | 0.8 |

<Analysis>

Each of the cBN sintered materials of samples 2-1 to 2-25 and 2-27 corresponds to an example of the present disclosure.

The cBN sintered material of sample 2-26, in which the dislocation density of the cBN grains is less than $3\times10^{17}/m^2$, corresponds to a comparative example.

The cBN sintered material of sample 2-28, in which the volume ratio of the cBN grains is less than or equal to 80 volume %, corresponds to a comparative example.

The cBN sintered material of sample 2-29, in which the dislocation density of the cBN grains is more than $1\times10^{20}/m^2$, corresponds to a comparative example.

In the cutting of the hardened steel, it was confirmed that each of samples 2-1 to 2-25 and 2-27 corresponding to the examples of the present disclosure has a tool life longer than that of each of samples 2-26, 2-28, and 2-29 corresponding to the comparative examples. This is presumably because each of samples 2-1 to 2-25 and 2-27 corresponding to the examples of the present disclosure has excellent breakage resistance.

Heretofore, the embodiments and examples of the present disclosure have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

The invention claimed is:

1. A cubic boron nitride sintered material comprising:
    more than 80 volume % and less than 100 volume % of cubic boron nitride grains; and
    more than 0 volume % and less than 20 volume % of a binder phase, wherein
    the binder phase includes
    at least one selected from a group consisting of a simple substance, an alloy, and an intermetallic compound selected from a group consisting of a group 4 element, a group 5 element, a group 6 element in a periodic table, aluminum, silicon, cobalt, and nickel,
    at least one selected from a group consisting of a compound composed of at least one element selected from the group consisting of the group 4 element, the group 5 element, the group 6 element in the periodic table, aluminum, silicon, cobalt, and nickel, and at least one element selected from a group consisting of nitrogen, carbon, boron, and oxygen, and a solid solution originated from the compound, or
    the at least one selected from the group consisting of the simple substance, the alloy, and the intermetallic compound selected from the group consisting of the group 4 element, the group 5 element, the group 6 element in the periodic table, aluminum, silicon, cobalt, and nickel, and the at least one selected from the group consisting of the compound composed of the at least one element selected from the group consisting of the group 4 element, the group 5 element, the group 6 element in the periodic table, aluminum, silicon, cobalt, and nickel, and the at least one element selected from the group consisting of nitrogen, carbon, boron, and oxygen, and the solid solution originated from the compound, and
    a dislocation density of the cubic boron nitride grains is more than or equal to $3\times10^{17}/m^2$ and less than or equal to $1\times10^{20}/m^2$.

2. The cubic boron nitride sintered material according to claim 1, wherein the dislocation density of the cubic boron nitride grains is more than or equal to $5\times10^{17}/m^2$ and less than or equal to $9.5\times10^{19}/m^2$.

3. The cubic boron nitride sintered material according to claim 1, wherein the dislocation density of the cubic boron nitride grains is more than or equal to $8\times10^{17}/m^2$ and less than or equal to $9\times10^{19}/m^2$.

4. The cubic boron nitride sintered material according to claim 1, wherein each of the cubic boron nitride grains contains more than or equal to 0.02 mass % and less than or equal to 0.2 mass % of calcium.

5. The cubic boron nitride sintered material according to claim 1, wherein each of the cubic boron nitride grains contains more than or equal to 0.05 mass % and less than or equal to 0.17 mass % of calcium.

6. The cubic boron nitride sintered material according to claim 1, wherein each of the cubic boron nitride grains contains more than or equal to 0.07 mass % and less than or equal to 0.15 mass % of calcium.

* * * * *